(12) United States Patent
Maeng et al.

(10) Patent No.: US 12,154,120 B1
(45) Date of Patent: Nov. 26, 2024

(54) CUSTOMIZED DEVICE RATING SYSTEM USING DEVICE PERFORMANCE INFORMATION

(71) Applicant: Wells Fargo Bank, N.A., San Francisco, CA (US)

(72) Inventors: Joon Maeng, Newcastle, WA (US); Ramanathan Ramanathan, Bellevue, WA (US); Abhijit Rao, Irvine, CA (US); Andres J. Saenz, Cape Coral, FL (US); Chris Theodore Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 118 days.

(21) Appl. No.: 17/646,245

(22) Filed: Dec. 28, 2021

Related U.S. Application Data

(63) Continuation of application No. 16/900,151, filed on Jun. 12, 2020, now Pat. No. 11,250,446.

(51) Int. Cl.
  *G06Q 30/02* (2023.01)
  *G06Q 30/06* (2023.01)
  (Continued)

(52) U.S. Cl.
  CPC ............ *G06Q 30/02* (2013.01); *G06Q 30/06* (2013.01); *G06Q 40/02* (2013.01); *H04L 9/0643* (2013.01); *H04L 9/50* (2022.05)

(58) Field of Classification Search
  CPC .......... G06Q 30/02; H04L 9/0643; H04L 9/50
  See application file for complete search history.

(56) References Cited

U.S. PATENT DOCUMENTS 7,941,267 B2  5/2011  Adamczyk et al.
8,655,762 B2  2/2014  Abifaker
(Continued)

FOREIGN PATENT DOCUMENTS

CN  108694518 A  10/2018
CN  109191275 A  1/2019
(Continued)

OTHER PUBLICATIONS

Response to Office Action dated Jul. 22, 2022 from U.S. Appl. No. 16/723,067, filed Oct. 20, 2022, 13 pp.
(Continued)

*Primary Examiner* — Scott C Anderson
(74) *Attorney, Agent, or Firm* — Shumaker & Sieffert, P.A.

(57) ABSTRACT

An example method includes sending a request for performance information associated with one or more candidate devices with which a device may perform a new transaction, responsive to sending the request, receiving the performance information that includes data associated with at least one historical transaction previously performed by the one or more candidate devices, analyzing the performance information using one or more device-specific performance criteria defined by the device, wherein the one or more device-specific performance criteria are associated with the new transaction and/or the candidate devices, determining, based on the analyzing, rating information associated with the candidate devices, wherein the rating information is customized for the device using the device-specific performance criteria that are defined by the device, selecting, based on the rating information, a particular candidate device from the one or more candidate devices, and initiating, with the particular candidate device, performance of the new transaction.

16 Claims, 5 Drawing Sheets

(51) Int. Cl.
*G06Q 40/02* (2023.01)
*H04L 9/06* (2006.01)
*H04L 9/00* (2022.01)

(56) References Cited

U.S. PATENT DOCUMENTS

| | | | |
|---|---|---|---|
| 10,038,700 B1 | 7/2018 | Duchin et al. | |
| 10,055,722 B1* | 8/2018 | Chen | G06Q 30/06 |
| 10,142,868 B2* | 11/2018 | Mohammed | H04M 15/46 |
| 10,237,290 B2 | 3/2019 | Balakrishnan et al. | |
| 10,326,766 B2 | 6/2019 | Egner et al. | |
| 10,338,913 B2 | 7/2019 | Franchitti | |
| 10,497,022 B2* | 12/2019 | Carlson | G06Q 30/0261 |
| 11,138,657 B1 | 10/2021 | Boeder et al. | |
| 2006/0224502 A1 | 10/2006 | McGowan | |
| 2008/0052224 A1 | 2/2008 | Parker | |
| 2008/0103970 A1 | 5/2008 | Books et al. | |
| 2008/0156868 A1 | 7/2008 | Slen et al. | |
| 2009/0076972 A1 | 3/2009 | Witchel et al. | |
| 2009/0287605 A1 | 11/2009 | Galit et al. | |
| 2010/0057609 A1 | 3/2010 | Sibson | |
| 2011/0178899 A1 | 7/2011 | Huszar | |
| 2011/0246306 A1 | 10/2011 | Blackhurst et al. | |
| 2012/0265681 A1 | 10/2012 | Ross | |
| 2013/0117174 A1 | 5/2013 | Cole et al. | |
| 2013/0218675 A1 | 8/2013 | Choi | |
| 2014/0067650 A1 | 3/2014 | Gardiner et al. | |
| 2014/0074701 A1 | 3/2014 | Kingston et al. | |
| 2014/0122340 A1 | 5/2014 | Flitcroft et al. | |
| 2015/0066739 A1 | 3/2015 | Lucas, Jr. et al. | |
| 2015/0073929 A1 | 3/2015 | Psota et al. | |
| 2015/0310470 A1 | 10/2015 | Mathew et al. | |
| 2016/0267584 A1 | 9/2016 | Nair | |
| 2017/0011324 A1 | 1/2017 | Truong et al. | |
| 2017/0061535 A1 | 3/2017 | Williams | |
| 2017/0068792 A1 | 3/2017 | Reiner | |
| 2017/0169497 A1 | 6/2017 | Lee et al. | |
| 2018/0039970 A1 | 2/2018 | Gorenstein | |
| 2018/0089605 A1 | 3/2018 | Poornachandran et al. | |
| 2018/0137593 A1 | 5/2018 | Djuric et al. | |
| 2018/0164785 A1 | 6/2018 | Frederick et al. | |
| 2018/0268387 A1* | 9/2018 | Bradley | G06Q 20/322 |
| 2018/0308134 A1 | 10/2018 | Manning et al. | |
| 2019/0020657 A1 | 1/2019 | Egner et al. | |
| 2019/0026716 A1 | 1/2019 | Anbukkarasu et al. | |
| 2019/0034924 A1 | 1/2019 | Prabhu et al. | |
| 2019/0081789 A1 | 3/2019 | Madisetti et al. | |
| 2019/0197430 A1 | 6/2019 | Arditi | |
| 2019/0228448 A1* | 7/2019 | Bleicher | G06Q 30/0631 |
| 2019/0295064 A1 | 9/2019 | Malo | |
| 2020/0051058 A1 | 2/2020 | Nandakumar et al. | |
| 2020/0082394 A1 | 3/2020 | Jain et al. | |
| 2020/0082423 A1 | 3/2020 | Glazier et al. | |
| 2020/0184555 A1 | 6/2020 | Gleizer | |
| 2020/0201679 A1* | 6/2020 | Wentz | G06F 9/468 |
| 2021/0142397 A1 | 5/2021 | Soundararajan et al. | |
| 2021/0234919 A1* | 7/2021 | Paralikar | H04L 67/563 |

FOREIGN PATENT DOCUMENTS

| | | |
|---|---|---|
| CN | 109472596 | 3/2019 |
| CN | 109492774 | 3/2019 |
| KR | 101995871 B1 | 9/2014 |
| KR | 101802771 B1 | 11/2017 |

OTHER PUBLICATIONS

Notice of Allowance from U.S. Appl. No. 16/723,067 dated Feb. 8, 2023, 10 pp.
Response to Final Office Action dated Nov. 22, 2022 from U.S. Appl. No. 16/723,067, filed Jan. 23, 2023, 12 pp.
Office Action from U.S. Appl. No. 16/723,067 dated Jul. 22, 2022, 17 pp.
U.S. Appl. No. 16/723,067, filed Dec. 20, 2019, naming inventors Kalaboukis et al.
Campana et al., "A machine-learned ranking algorithm for dynamic and personalized car pooling services," Nov. 2016, 7 pages.
Lane et al., "Lowering Financial Inclusion Barriers With a Blockchain-Based Capital Transfer System," Whitepaper Version 1.1, 2017, 28 pp. (Applicant points out, in accordance with MPEP 609.04(a), that the year of publication, 2017, is sufficiently earlier than the effective U.S. filing date, so that the particular month of publication is not in issue.).
Prosecution History from U.S. Appl. No. 16/723,067, dated Aug. 16, 2021 through Nov. 16, 2021, 31 pp.
Prosecution History from U.S. Appl. No. 16/900,151, dated Jun. 16, 2021 throughOct. 14, 2021, 13 pp.
Rajasingham, "Welcome to the machine-to-machine economy," CAN, accessed from https://www.commbank.com.au/guidance/newsroom/corporate-travel1-201711.html, published online Nov. 28, 2017, 8 pp.
Ruiz, "How to add Support for gift cards on your Ethereum-based dapps," Dec. 28, 2017, 1 pp.
Shala et al., "Novel trust consensus protocol and blockchain-based trust evaluation system for M2M application services," Internet of Things 7 (2019), Elsevier, accepted May 10, 2019, 25 pp.
Srinidhi et al., "Network optimizations in the Internet of Things: A review," International Journal of Engineering Science and Technology 22 (2019), Elsevier, accepted Sep. 9, 2018, 21 pp.
Strugar et al., "An architecture for distributed ledger-based M2M auditing for Electric Autonomous Vehicles," Workshops of the International Conference on Advanced Information Networking and Applications, Mar. 15, 2019, accessed from SpringLink, arXiv:1804.00658v2, 12 pp.
Wang, "Optimizing ride matches for dynamic ride-sharing systems," Thesis, Doctor of Philosophy in the School of Industrial and Systems Engineering, Georgia Institute of Technology. Retrieved from https://smartech.gatech.edu/bitstream/handle/1853/47668/wang_xing_201305_phd.pdf, May 2013, 125 pages.
Yang et al., "New Loan System Based on Smart Contract," ACM International Symposium on Blockchain and Secure Critical Infrastructure (BSCI '19), Jul. 8, 2019, 6 pp.
Advisory Action from U.S. Appl. No. 16/723,067, dated May 13, 2022, 3 pp.
Response to Final Office Action dated Feb. 22, 2022, from U.S. Appl. No. 16/723,067, filed Apr. 21, 2022, 14 pp.
Response to Final Office Action dated Feb. 22, 2022, from U.S. Appl. No. 16/723,067, filed May 23, 2022, 14 pp.
Final Office Action from U.S. Appl. No. 16/723,067 dated Nov. 22, 2022, 17 pp.
Final Office Action from U.S. Appl. No. 16/723,067, dated Feb. 22, 2022, 16 pp.

* cited by examiner

CUSTOMIZED DEVICE RATING SYSTEM USING DEVICE PERFORMANCE INFORMATION

CROSS REFERENCE

This application is a continuation application of and claims priority to U.S. patent application Ser. No. 16/900,151 filed on Jun. 12, 2020, which is hereby incorporated by reference herein in its entirety.

TECHNICAL FIELD

The present disclosure relates to distributed computing systems.

BACKGROUND

In many instances, devices such as machines may interact with each other within a distributed system. For example, a first device associated with a user may be configured to engage in a transaction with a second device to purchase a product (e.g., a physical or virtual product). In these cases, before engaging in the transaction, the user of the first device may access a vendor-based rating system to try and assess the trustworthiness of the second device. For example, a vendor-based rating system may capture previously provided ratings that have been manually input by other users who have previously engaged in similar transactions. Existing vendor- or provider-based rating systems typically require manual input from one or more users to capture these types of ratings, and the vendor or provider typically predefines the types of ratings (e.g., one to five stars) that may be input by these users.

SUMMARY

In general, this disclosure describes techniques for implementing a dynamic and customer-centric device rating system that enables a first device (e.g., first machine) to dynamically and autonomously determine rating information (e.g., real-time rating information) for other candidate devices with which to perform a new transaction based on received performance information associated with these candidate devices. In various examples, the distributed system may enable autonomous device-to-device (e.g., machine-to-machine) transactions that do not involve user or human intervention. Dynamic and customized rating determination techniques are described that enable a first device to determine a rating of at least one candidate device based on performance information that is related to contextual data and/or historical transactions performed by the at least one candidate device. The first device analyzes the performance information and rates the performance of the at least one candidate device based on parameters or criteria defined by and customized for the first device. In this way, the techniques provide a customer-centric device rating system. The contextual and/or transaction data may be stored using blockchain technology or in a central authority to, e.g., ensure data that is trustworthy and tamperproof. The first device may use the dynamic ratings to identify, for example, the capabilities and/or trustworthiness of the at least one candidate device and to determine whether to perform a transaction.

As one example, this disclosure is directed to a computing system comprising a storage device and processing circuitry, wherein the processing circuitry has access to the storage device and is configured to: output a request for information about a plurality of candidate devices capable of performing a new transaction; receive, after outputting the request, performance information about the plurality of candidate devices, wherein the performance information includes data associated with each of the plurality of candidate devices that have previously performed a historical transaction; identify, based on the performance information and selection criteria available to the computing system, a selected candidate device from among the plurality of candidate devices; and initiate the new transaction with the selected candidate device.

As another example, this disclosure is directed to a method comprising: outputting, by a computing system, a request for information about a plurality of candidate devices capable of performing a new transaction; receiving, by the computing system and after outputting the request, performance information about the plurality of candidate devices, wherein the performance information includes data associated with each of the plurality of candidate devices that have previously performed a historical transaction; identifying, by the computing system and based on the performance information and selection criteria available to the computing system, a selected candidate device from among the plurality of candidate devices; and initiating, by the computing system, the new transaction with the selected candidate device.

As another example, this disclosure is directed to a computer-readable medium comprising instructions that, when executed, configure processing circuitry of a computing system to: output a request for information about a plurality of candidate devices capable of performing a new transaction; receive, after outputting the request, performance information about the plurality of candidate devices, wherein the performance information includes data associated with each of the plurality of candidate devices that have previously performed a historical transaction; identify, based on the performance information and selection criteria available to the computing system, a selected candidate device from among the plurality of candidate devices; and initiate the new transaction with the selected candidate device.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
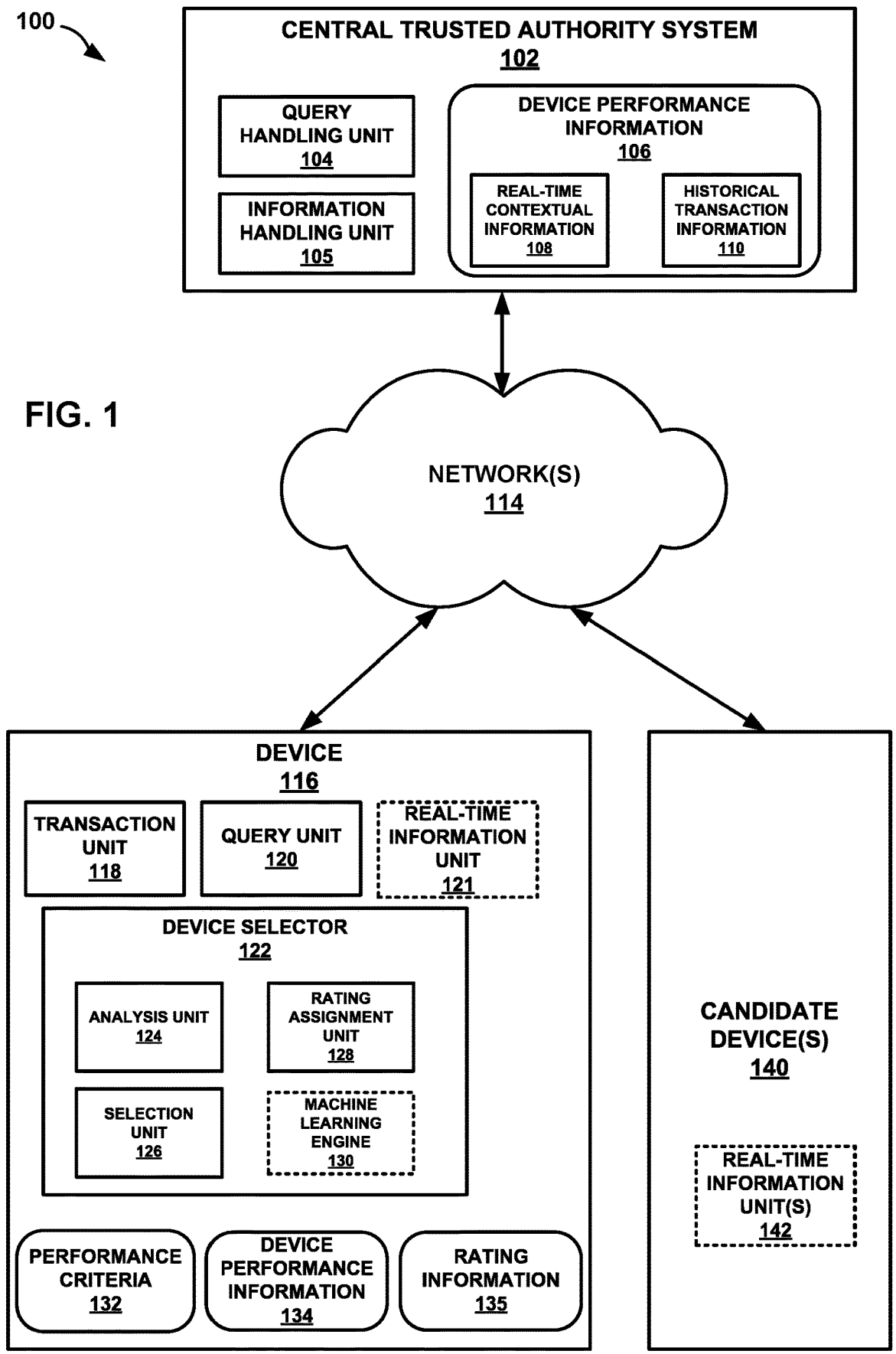
FIG. 1 is a block diagram illustrating an example distributed system that is configured to determine rating information associated with one or more candidate devices within the system, in accordance with techniques of this disclosure.

For device-to-device (e.g., machine-to-machine) transactions, it may often be beneficial for a first device to verify the capabilities and/or trustworthiness of a second device prior to using the second device to perform a transaction. For example, a first device associated with a user may be configured to engage in a transaction with a second device to purchase a widget (e.g., a physical or virtual widget). One way of gauging the capabilities and/or trustworthiness of the second device is through the use of a rating system, which may provide ratings of the second device based upon prior transactions with the second device. Existing rating systems often use ratings provided by humans, which are subjective and static. Since devices such as machines may often change owners or, in the case of virtual machines, be torn down and later re-instantiated, static ratings of the second device may often not be accurate. In addition, traditional rating systems are often provider- or vendor-centric in that they capture ratings based on a fixed set of questions and fixed set of values (e.g., number of stars for quality, timeliness, or other expected performance variable), which are determined by the provider or the rating system. A consumer or requesting device, however, may have a specific set of parameters or criteria that it most values when selecting another device with which to perform a transaction. These parameters or criteria may be difficult or impossible to discern from traditional rating systems.

The present disclosure describes techniques for implementing a dynamic and customer-centric device rating system that enables a first device (e.g., first machine) to dynamically and autonomously determine rating information (e.g., real-time rating information) for other candidate devices with which to perform a new transaction. The described rating determination techniques enable a first device to determine a rating of at least one candidate device based on performance information that is related to contextual data and/or historical transactions performed by the at least one candidate device. The first device analyzes the performance information and rates the performance of the candidate device(s) based on parameters or criteria that are defined by and customized for the first device.

In various examples, a device (e.g., machine) may comprise a physical entity (e.g., a computing device, a computer server, a quantum computer, a desktop computer, a tablet computer, a laptop computer, any mechanical device with computing engine such as a self-driving automobile, drone, parking meter, highway toll, sensor with computing engine such as Internet of Things, smartphone, etc.) and/or virtual entity (e.g., virtual machine, application software in a computing machine, cloud computing system, etc.). In certain examples, a device (e.g., machine) may include one or more computers that process information, sensors that monitor performance and movement, and/or devices with embedded computers such as smartphones, television sets, radios, wireless headsets, digital cameras, global positioning system (GPS) based navigators, automated teller machines, drones, traffic lights, battery chargers, parking meters, and so on. Some devices conduct a single function and others carry out multiple functions.

FIG. 1 is a block diagram illustrating an example distributed system 100 that is configured to determine rating information associated with one or more candidate devices 140 within system 100, in accordance with techniques of this disclosure. As shown in FIG. 1, distributed system 100 includes a central trusted authority system 102, device (e.g., machine) 116, and one or more candidate devices (e.g., candidate machines) 140 that are included in or otherwise communicatively coupled to central trusted authority system 102 via one or more networks 114. Networks 114 may comprise one or more wired and/or wireless communication networks, such that central trusted authority system 102, device 116, and candidate devices 140 may communicate with one another via one or more wired and/or wireless connections. Central trusted authority system 102, device 116, and candidate devices 140 may be physically located at one geographical location or may be distributed among different geographical locations. The components illustrated in FIG. 1 may comprise one or more physical or virtual components. For instance, device 116 and candidate devices 140 may each comprise one or more physical device or a virtual device (e.g., virtual machine).

As will be described in further detail below, device 116 may use a query unit 120 to send a request (e.g., to central authority system 102 in FIG. 1 or blockchain node network 214 shown in FIG. 2) for performance information that is associated with one or more of candidate devices 140 with which device 116 may perform a new transaction. Responsive to sending the request, query unit 120 may receive the performance information (e.g., one or more portions of device performance information 106 stored by central authority system 102), which includes data associated with at least one historical transaction previously performed by candidate devices 140. In some instances, this performance information may also include real-time contextual information, such as one or more portions of real-time contextual information 108. In these instances, query handling unit 104 may include these portions of real-time contextual information 108 when providing performance information back to device 116 in response to the query sent by query unit 120. In alternate examples, device 116 may send a separate query to query handling unit 104 to request portions of real-time contextual information 108 (e.g., using optional real-time information unit 121, as described in more detail below).

Device 116 may then analyze the received performance information, such as by using an analysis unit 124 of device selector 122. Analysis unit 124 analyzes this performance information using one or more device-specific performance criteria 132, which are specific to and defined by device 116. As will be described in further detail below, device-specific performance criteria 132 are associated with at least one of the new transaction or the one or more candidate devices, and may be specifically defined and/or customized for use by device 116 at any given time. In some cases, device 116 may store the received performance information locally as device performance information 134, as indicated in FIG. 1.

Device 116 may then use a rating assignment unit 128 to determine, based on the analysis performed by analysis unit 124, device-specific rating information, which is specific to and customized for device 116 and which is associated with candidate devices 140. The rating information is customized for device 116 using the device-specific performance criteria 132 that are defined by device 116. Selection unit 126 of device 116 may select, based on the device-specific rating information, a particular candidate device from candidate devices 140. Transaction unit 118 of device 116 may then initiate, with the particular candidate device, performance of the new transaction.

As a result, the disclosed techniques implement a dynamic and customer-centric device rating system, using device-specific performance criteria 132 that are defined and specific to device 116, to enable device 116 to dynamically and autonomously determine rating information for candidate devices 140 with which to perform a new transaction. The described rating determination techniques enable device 116 to determine a rating of candidate devices 140 based on device performance information 134 that is received from, e.g., central authority system 102. Rating assignment unit 128 may assign ratings to one or more of candidate devices 140 based on device-specific performance criteria 132 to, e.g., identify the capabilities and/or trustworthiness of these candidates, and to determine whether to perform a transaction with a particular candidate device. Rating assignment unit 128 may store the assigned ratings locally within rating information 135. In various cases, rating assignment unit 128 may assign higher ratings or rankings to those one or more of candidate devices 140 that may satisfy or maximize performance criteria 132, and selection unit 126 may select the particular candidate device having the highest rating or ranking.

In some cases, rating assignment unit 128 may assign ratings to candidate devices 140 using performance criteria 132 and associated weights. For instance, each particular criterion of performance criteria 132 may have an associated weight that is also defined by device 116. These weights may comprise device-specific weights that are associated with a respective importance or ranking of each respective criterion. Rating assignment unit 128 may assign the ratings to candidate devices 140 using performance criteria 132 as they are applied to the received performance information stored in device performance information 134, in accordance with the device-specific weights. The received performance information is associated with respective ones of candidate devices 140. Selection unit 126 may then select one or more of candidate devices 140 based on the determined ratings.

In some examples, selection unit 126 may use certain criteria to select filtered groups of candidate devices 140. For instance, selection unit 126 may use a first criterion of performance criteria 132, as applied to device performance information 134, to identify a first group of one or more candidate devices with which device 116 may perform a transaction. From this first group of candidate devices, selection unit 126 may use a second criterion of performance criteria 132, as applied to the portion of device performance information 134 that is associated with the first group of candidate devices, to identify a second group of one or more candidate devices, where the second group is a subgroup of the first group. As noted above, device performance information 134 may include performance information that is received from central authority system 102 (e.g., a portion of device performance information 106). Individual portions of device performance information 134 may each be associated with a particular candidate device of candidate devices 140. Selection unit 126 may select one or more candidate devices from the within the second group, and transaction unit 118 may initiate performance of a transaction with the selected candidate devices.

As noted above, performance criteria 132 may comprise device-specific criteria that are defined by, and specific to, device 116. These performance criteria 132 may represent particular factors or parameters that are important to, or weighted more heavily by, device 116 at any particular point in time. Performance criteria 132 of device 116 may be customizable and/or modifiable based on the current or updated importance of these associated factors or parameters, as they may change over time and/or as they change between transactions. In this way, device 116 generates its own dynamic ratings of the other candidate devices 140 in the network, and these ratings may potentially change over time based, e.g., on changes to current operating conditions (e.g., real-time contextual information) of these candidate devices, and/or based on changes to performance criteria 132 as defined by device 116 that are applied to device performance information 134 associated with these candidate devices. In certain examples, performance criteria 132 may include one or more criteria that indicate, or are otherwise associated with, one or more of a type of services previously performed by candidate devices 140, capabilities of candidate devices 140 to perform requested services, cost or timing characteristics associated with services previously performed by candidate devices 140, operating systems or communication protocols used by the one or more candidate devices 140, hardware and/or software components of the one or more candidate devices 140 to properly execute or provide services, technical specifications and/or capabilities of the one or more candidate devices 140, a quality of services provided by candidate devices 140, and/or a trustworthiness of candidate devices 140.

Historical transaction information 110 may include any form of transaction data associated with prior transactions performed by candidate devices 140, such as prior transactions performed with one or more other devices. For example, historical transaction information 110 may include historical transaction volume or count, amount of money/data, and/or machine operating data associate with prior transactions. Machine operating data may include environmental condition data, location data, and/or time data associated with these transactions. In some cases, the historical data may include user-provided feedback or manually entered rating information provided by customers of services or products provided by candidate devices 140. The transaction data may be stored in device performance information 106 of central authority system 102 to try and ensure that the data that is trustworthy and tamperproof. For example, each time a device (e.g., device 116, one of candidate devices 140) that is communicatively coupled to network 114 performs a transaction with another device, this device may store data related to the transaction within historical transaction information 110.

In some examples, device selector 122 may use analysis unit 124, rating assignment unit 128, and/or selection unit 126 to select candidate devices 140 using real-time contextual information that is provided by optional real-time information unit 121. Real-time information unit 121 may determine or obtain real-time contextual information associated with real-time performance or operational data associated with one or more of candidate devices 140, and may store such information within its locally stored device performance information 134, such that performance information 134 includes this real-time contextual information and historical transaction information (e.g., data associated with at least one historical transaction previously performed by one or more of candidate devices 140). Rating assignment unit 128 may apply performance criteria to device performance information 134, as described previously, in determining rating information 135, where device performance information 134 includes this real-time contextual information. This information may include, e.g., real-time transaction volume or count information, real-time money/data information, hardware or software component data associated with one or more of candidate devices 140, technical specification or capability data associated with one or more of candidate devices 140, and/or real-time machine operating data (e.g., environmental data, location data, time data) associated with one or more of candidate devices 140.

In some cases, real-time information unit 121 may collect or determine such information based on data provided by one or more of candidate devices 140 (e.g., from optional real-time information units 142 that may be included or otherwise associated with one or more of candidate devices 140), which may, in some cases, include sensor-based data. In some cases, real-time information unit 121 may obtain such information from central authority system 102, which may store real-time contextual information 108 within its device performance information 106. For instance, real-time information unit 121 may send a query to query handling unit 104 to request real-time contextual information for one or more of candidate devices 140. Real-time information unit 121 may, for example, include device identifiers within the query of those ones of candidate devices 140 for which it requests information, and query handling unit 104 may obtain corresponding information from real-time contextual information 108 based on the device identifiers and provide the information back to real-time information unit 121 responsive to the query. In various examples, the described functionality of real-time information unit 121 may also be performed, in full or in part, by query unit 120. In these examples, query unit 120 may send a query to query handling unit 104 of central authority system 102, and query handling unit 104 may return one or more portions of real-time contextual information 108 to query unit 120, responsive to the query.

Over time, central authority system 102 may use an information handling unit 105 to obtain and/or update information included within real-time contextual information 108, which may include operating data associated with operation of candidate devices 140. In some cases, information handling unit 105 may obtain such information via real-time information units 142 associated with candidate devices 140. In other cases, information handling unit 105 may monitor transactions that occur with candidate devices 140 to obtain real-time contextual data for storage in real-time contextual information 108.

In certain examples, device selector 122 may use or apply an optional machine learning engine 130 to select one or more of candidate devices 140 for performing a transaction. Machine learning engine 130 may apply an artificial intelligence model that is trained to assign a rating to a given candidate device based on the performance data received for that device, which is stored in device performance information 134. Device 116 may then use ratings assigned to each of the different candidate devices using rating assignment unit 128 and/or machine learning engine 130, and selection unit 126 may determine which of candidate devices 140 have, e.g., the highest rating for device 116's most valued parameters based on application of performance criteria 132. Over time, machine learning engine 130 may be configured to continuously learn which criteria are more important, or have higher weight, based on monitored behavior of device 116, and machine learning engine 130 may correspondingly update performance criteria 132. In such fashion, performance criteria 132 may include the most current and/or pertinent performance criteria to use at any given time, and these criteria are customized specifically to device 116 based on relevance and/or importance of relevant performance parameters.

In various cases, historical transaction information 110 may include information associated with transactions that are or have been performed within system 100, such as between device 116 and/or candidate devices 140. This information may include specific information for each individual transaction, such as the type of transaction, metadata associated with the transaction, and any identifiers (e.g., machine identifiers) of devices that were involved in the respective transaction. Transaction information 110 may be populated and updated based upon information collected and/or provided by information handling unit 105. In various examples, information handling unit 105 is capable of monitoring transactions that occur within system 100. In certain cases, information handling unit 105 is configured to populate and update transaction information 110 based upon direct involvement of central authority system 102 in certain transactions that occur between devices and/or with central authority system 102. In some cases, information handling unit 105 is configured to populate and update historical transaction information 110 based upon transaction data it receives from one or more of device 116 and/or candidate devices 140.

In some cases, real-time contextual information 108 and/or historical transaction information 110 may be associated with individual device profiles. Each individual device profile may include information associated with a respective device. For instance, each device profile may include identification data (e.g., a unique identifier), capability data, and/or rating data for each respective device. Central authority system 102 may populate and/or update the information contained in device profiles based upon information received by query handling unit 104 and/or information handling unit 105. In some cases, central authority system 102 may determine or assign certain information contained in these device profiles. For example, in some cases, central authority system 102 may be configured to define and/or assign unique identifiers for each of device 116 and candidate devices 140 in system 100, and store these within the respective device profiles.

In the case of a physical device, the unique identifier for the device may, in some cases, be the device's Internet Protocol (IP) or media access control (MAC) address. In the case of a virtual device (e.g., virtual machine), the unique identifier may be an identifier associated with or assigned by the physical device on which the virtual device is executed. In some examples, the identifiers of all the devices, whether physical or virtual, are assigned by central authority system 102, which may ensure that all currently active devices have a unique identifier. In addition, central authority system 102 may periodically refresh the identifiers to remove identifiers of devices that are no longer available and assign new identifiers to newly available machines. In this way, central authority system 102, as opposed to individual devices with system 100, manages the identification of any virtual devices (e.g., virtual machines), which may be torn down and re-instantiated over time.

In the example of FIG. 1, and as indicated previously, candidate devices 140 may include optional real-time information units 142. For example, each candidate device may include a respective real-time information unit. However, in certain cases, at least one candidate device of candidate devices 140 may be similar to, or include the components illustrated in, device 116. In these cases, one or more of candidate devices 140 may each include a transaction unit, a query unit, an optional real-time information unit, a device selector, performance criteria, device performance information, and rating information.

Referring again to device 116, transaction unit 118 is configured to initiate and/or otherwise process transactions between device 116 and one or more other entities, such as with other candidate devices 140 and/or with central authority system 102. Transaction unit 118 may communicate with corresponding transaction units of other devices, and may in some cases also communicate with information handling unit 105 of central authority system 102, such as when device 116 performs transactions that may involve central authority system 102, or when device 116 sends transaction data associated with one or more other devices (e.g., one or more of candidate devices 140) to central authority system 102.

Query unit 120 is configured to send queries to query handling unit 104 of central authority system 102 and receive identifications of other candidate devices 140 with which to perform a transaction, as well as corresponding portions of real-time contextual information 108 and/or historical transaction information 110. The queries provided by query unit 118 may, in certain cases, specify one or more criteria or parameters associated with a desired transaction (e.g., type of service to be performed, preferred location associated with transaction, location information associated with a current location of device 116 or preferred locations of candidate devices 140, preferred cost and/or timeframe of service, preferred communication protocols, preferred operating systems). In response to these queries, query unit 120 may receive, from query handling unit 104, an identification of one or more candidate devices 140 with which to perform desired transactions, as well as corresponding portions of real-time contextual information 108 and/or historical transaction information 110. As noted earlier, in some cases, device 116 may use an optional real-time information unit 121 to send queries for real-time contextual information. In these cases, real-time information unit 121 may be configured to send queries to query handling unit 104 and/or candidate devices 140 to receive real-time contextual information associated with one or more of candidate devices 140.

In various cases, query handling unit 104 of central authority system 102 may identify candidate devices 140 based upon information included in device performance information 106. Query handling unit 104 may determine which candidate devices and/or corresponding device performance information 106 for these devices, satisfy the criteria or parameters (if any) specified in the queries received from query unit 120 (e.g., parameters associated with the type of service to be performed, preferred cost and/or timeframe and/or location of service, preferred communication protocols, preferred operating systems, location of device 116, etc.)

Query handling unit 104 may obtain the device identification data and portions of real-time contextual information and/or historical transaction information 110 that correspond to matching candidate devices 140, and send this data to query unit 120. For instance, if query handling unit 104 determines that first and second candidate devices from candidate devices 140 satisfy the specified parameters or criteria from the query, query handling unit 104 may send corresponding portions of device performance information 106 (e.g., the device identifiers of these first and second candidate devices, as well as portions of real-time contextual information and historical transaction information 110 that are associated with these candidate devices) to query unit 120. Query unit 120 may store this within its local device performance information 134. In some cases, query unit 120 may work in concert with real-time information unit 121 to obtain corresponding portions of real-time contextual information 108 from central authority system 102 and/or from real-time information units 142.

As described earlier, device 116 may use device selector 122 to apply performance criteria 132 to device performance information 134 and determine rating information 135 of respective candidate devices. Rating information 135 may comprise real-time rating information that is dynamically and autonomously performed by device 116 at any point in time. The real-time rating information may identify or indicate at least one characteristic of services performed by candidate devices 140. For instance, these characteristics may be or provide indications of services that are performed by the candidate devices 140, capabilities of the candidate devices 140 to perform requested services, cost or timing characteristics associated with performed services, operating systems or communication protocols used by the candidate devices 140, quality of services provided, and/or trustworthiness of candidate devices 140.

As a first illustrative use case, device 116 may be a consumer's mobile device that is executing a ride-sharing application and, thus, looking to identify one or more of candidate devices 140 that may be or be coupled to a vehicle. In this use case, candidate devices 140 may be devices that are part of or otherwise communicatively coupled to a ride-sharing vehicle. Performance criteria 132 may include one or more criteria that identify the consumer's valued parameters or criteria at any particular point in time. For instance, performance criteria 132 may include a first criterion that relates to speed of service, and a second criterion that relates to driving safety. Each criterion may have an associated weight or ranking value that also may be changed or customized over time. At a first point in time, the customer may have a strong preference for speed over safety (e.g., if the customer is late and needs to travel to the airport very quickly to avoid missing a flight). In this case, the weight or ranking value of the first criterion may be defined or adjusted (e.g., autonomously by device 116 based on existing conditions or input provided by machine learning engine 130; by device 116 based on user input from the customer) such that it is higher than the weight or ranking value of the second criterion. However, at another second point in time (e.g., another day), the customer may instead have a strong preference for safety over speed. In this case, the weight or ranking value of the second criterion may be defined or adjusted such that it is higher than the weight or ranking value of the first criterion.

In this first use case, device 116 may use query unit 120 to send a query to query handling unit 104 of central authority system 102 (or, in another example, to blockchain node networks 214 of FIG. 2) to request one or more portions of device performance information 106 associated with candidate devices of available vehicles within a certain distance of device 116. In various examples, query unit 120 may include real-time location information for device 116, as well as a requested distance parameter for available vehicles, within the query. In certain cases, the query sent by query unit 120 may include one or more additional parameters associated with requested features of candidate devices 140. For example, the user of device 116 may be interested in identifying certain ones of candidate devices 140 associated with certain types of vehicles (e.g., sedans, sports utility vehicles), certain cost restrictions or features, and the like. In these cases, query handling unit 104 of central authority system 102 may identify which ones of candidate devices 140, along with associated device performance information 106, also satisfy the additional parameters specified in the query from device 116.

Query handling unit 104 of central authority system 102 may then process the received query, and access portions of device performance information 106 that are associated with one or more of candidate devices 140 that are within the requested distance of device 116. For instance, query handling unit 104 may first access real-time contextual information 108 to identify the real-time locations of candidate devices, and to then determine which subset of candidate devices 140 are within the requested distance of device 116. For this subset of candidate devices 140, query handling unit 104 may then access historical transaction information 110 associated with this subset of candidate devices 140. Query handling unit 104 may provide the portions of real-time contextual information and/or historical transaction information 110, which are associated with this subset of candidate devices 140, back to query unit 120. Query unit 120 may store the received information within its local device performance information 134.

In some cases, the historical transaction information 110 associated with candidate devices 140 may include data such as historical vehicle operating data such as distances driven, time driven, payment amounts, location information, traffic conditions, weather conditions, average and maximum speeds driven, speed limits along the driving route(s), driving behavior, and the like. Similarly, real-time contextual information 108 associated with candidate devices 140 may include real-time vehicle operating data such as distances driven, time driven, location information, traffic conditions, weather conditions, average and maximum speeds driven, speed limits along the driving route(s), driving behavior, and the like.

Device selector 122 may use analysis unit 124 and rating assignment unit 128 to analyze the received device performance information for the subset of candidate devices 140 based on the currently defined performance criteria 132. For example, if the customer or user of device 116 prioritizes safety over speed, the second criterion of performance criteria 132, which relates to driving safety, will have an associated weight that is higher than the weight of the first criterion, which relates to speed of service. For example, the second criterion may relate to speed limit maintenance or other safe driving behavior parameters. Performance criteria 132 may include various different type of criteria. For instance, performance criteria 132 may include one or more criteria related to a type of services previously performed by the one or more of candidate devices 140, capabilities of the one or more candidate devices 140 to perform requested services, cost or timing characteristics associated with services previously performed by the one or more candidate devices 140, operating systems or communication protocols used by the one or more candidate devices 140, a quality of services provided by the one or more candidate devices 140, or a trustworthiness of the one or more candidate devices 140, to name only a few examples.

In some cases, the received performance information (e.g., from central authority system 102) may include real-time contextual information, such as a portion of real-time contextual information 108. In certain instances, real-time information unit 121 of device 116 may also collect real-time contextual information, such as described previously. Analysis unit 124 may also analyze the received performance information, which may include real-time contextual information, using performance criteria 132. The real-time contextual information may real-time information associated with, e.g., one or more of a transaction volume or count, an amount of data, hardware or software component data associated with one or more of candidate devices 140, technical specification or capability data associated with one or more of candidate devices 140, or machine operating data, where machine operating data includes at least one of environmental condition data, location data, or time data associated with the one or more of candidate devices 140. In some cases, the real-time contextual information associated with one or more of candidate devices 140 may include at least one of sensor data or capability data associated with the candidate device 140.

In this particular use case, the real-time contextual information, which may be stored locally in device performance information 134, may include information such as a real-time location of vehicles associated with candidate devices 140 at any particular point in time, data indicative of driving or safety conditions associated with these vehicles (e.g., data indicating that a particular vehicle associated with one or candidate devices 140 has recently violated safety regulations or laws), or vehicle operating data (e.g., current vehicle operating speeds, current version of machine operating system used in the vehicle, current condition of tires).

Rating assignment unit 128 may assign ratings to each of the subset of candidate devices 140 based on associated device performance information and performance criteria 132, and may store these ratings within rating information 135. Selection unit 126 may then select a particular candidate device from the subset of candidate devices 140 having the highest score or ranking, based on the currently defined criteria and weights from performance criteria 132. For example, selection unit 126 may select the particular candidate device of a vehicle that has historically maintained the speed limit and has not recently engage in erratic driving behavior (e.g., short stops and non-signaled lane changes), even if this particular candidate device is associated with a vehicle that has longer travel times or costs more money for ride-sharing purposes. In some cases, based on performance criteria 132 applied to any real-time contextual information for candidate devices 140, selection unit 126 may select a candidate device that has not been recently speeding or violated any safety guidelines or laws, or a candidate device that is closest to the current location of device 116.

While the use case described above illustrates one possible example, in certain other use cases, performance criteria 132 may be uniquely related to the components (e.g., technical specifications and/or capabilities) of candidate devices 140 themselves. That is, performance criteria 132 may relate to the components and/or capabilities of candidate devices 140 that enable operation of candidate devices 140. To name a few examples, performance criteria 132 may be based on processing capability (e.g., load balancing, speed, and/or efficiency), communication capability (e.g., available communication channels, reliability of channels, and/or channel signal strength), failure rate, power handling and supply, life span, and/or certification status, etc. In certain examples, performance criteria 132 may be related to one or more hardware or software components of candidate devices 140. For instance, device 116 may attempt to identify one or more of candidate devices 140 based on certain requirements for a processor, volatile or non-volatile memory, a graphics processing unit, data storage device, a network interface card, an operating system, etc., used or provided by one or more of candidate devices 140. As one example, in the example of a ride-sharing application, device 116 may identify one or more of candidate devices 140 that are capable of providing cellular or mobile connectivity at one or more locations (e.g., cell phone service at the airport or another point of interest).

As another illustrative use case, device 116 may be part of or associated with a consumer's home or building within a "smart" city environment. In this type of environment, devices associated with homes of buildings may be configured to purchase energy (e.g., electricity) packages from energy providers based on one or more criteria. These energy providers may be associated with the candidate devices 140 in FIG. 1. In this use case, device 116 may attempt to identify one or more of candidate devices 140 that provide energy based on the customized performance criteria 132 defined by the customer of device 116. Performance criteria may include one or more criteria that identify the consumer's valued parameters or criteria at any particular point in time (e.g., cost per unit of energy, uniformity of voltage/watts over time, savings based on bundled energy plans, and the like). Each criterion may have an associated weight or ranking value that also may be changed or customized over time, similar to the ride-sharing use case described above.

Device 116 may use query unit 120 to send a query to query handling unit 104 of central authority system 102 (or, in another example, to blockchain node networks 214 of FIG. 2) to request one or more portions of device performance information 106 associated with candidate devices of available energy providers within a certain distance of device 116. In various examples, query unit 120 may include real-time location information for device 116, as well a requested distance parameter for available energy providers, within the query. In certain cases, the query sent by query unit 120 may include one or more additional parameters associated with requested features of candidate devices 140.

Query handling unit 104 of central authority system 102 may then process the received query, and access portions of device performance information 106 that are associated with one or more of candidate devices 140 that provide services within the requested distance of device 116. For instance, query handling unit 104 may first access real-time contextual information 108 to identify the real-time locations of candidate devices, and to then determine which subset of candidate devices 140 provide services within the requested distance of device 116. For this subset of candidate devices 140, query handling unit 104 may then access historical transaction information 110 associated with this subset of candidate devices 140. Query handling unit 104 may provide the portions of real-time contextual information and/or historical transaction information 110, which are associated with this subset of candidate devices 140, back to query unit 120. Query unit 120 may store the received information within its local device performance information 134.

In some cases, the historical transaction information 110 associated with candidate devices 140 may include data such as historical operating data such as costs per unit of energy, uniformity of voltage/watts over time, costs of bundled energy plans, payment amounts, location information, and the like. Similarly, real-time contextual information 108 associated with candidate devices 140 may include real-time operating data, and may also include other real-time contextual information (e.g., information about current energy promotion or sales plans).

Device selector 122 may use analysis unit 124 and rating assignment unit 128 to analyze the received device performance information for the subset of candidate devices 140 based on the currently defined performance criteria 132. For example, if the customer or user of device 116 prioritizes cost over uniformity of voltage/watts over time, one criterion of performance criteria 132, which relates to costs, will have an associated weight that is higher than the weight of another criterion, which relates to uniformity. Rating assignment unit 128 may assign ratings to each of the subset of candidate devices 140 based on associated device performance information and performance criteria 132, and may store these ratings within rating information 135. Selection unit 126 may then select a particular candidate device from the subset of candidate devices 140 having the highest score or ranking, based on the currently defined criteria and weights from performance criteria 132. For example, selection unit 126 may select the particular candidate device of an energy provider that has historically provided good cost value, even if this particular candidate device is associated with an energy provider that has more fluctuation over time with respect to the voltage or wattage that is provided to the end user.

As another illustrative use case, device 116 may be part of or associated with a consumer's smart device or system that is configured to make certain decisions or take certain actions. For example, device 116 may be configured to identify a particular stock to buy via an online brokerage account. In this use case, candidate devices 140 may be associated with one or more information service providers (e.g., Internet search providers, social media providers). Device 116 may attempt to identify one or more of candidate devices 140 that provide information for making stock purchase decisions based on the customized performance criteria 132 defined by the customer of device 116. Performance criteria may include one or more criteria that identify the consumer's valued parameters or criteria at any particular point in time (e.g., type of information service provider, amount of stock information available to an information service provider, availability of information for both local and foreign stock exchanges, availability of information for stock and options, reliability of information, speed of accessing new and updated corporation information). Each criterion may have an associated weight or ranking value that also may be changed or customized over time, similar to the other use cases described above.

Device 116 may use query unit 120 to send a query to query handling unit 104 of central authority system 102 (or, in another example, to blockchain node networks 214 of FIG. 2) to request one or more portions of device performance information 106 associated with candidate devices of available information service providers. In certain cases, the query sent by query unit 120 may include one or more parameters associated with requested features of candidate devices 140 (e.g., features related to the criteria described above).

Query handling unit 104 of central authority system 102 may then process the received query, and access portions of device performance information 106 that are associated with one or more of candidate devices 140. For this subset of candidate devices 140, query handling unit 104 may then access historical transaction information 110 associated with this subset of candidate devices 140. Query handling unit 104 may provide the portions of real-time contextual information and/or historical transaction information 110, which are associated with this subset of candidate devices 140, back to query unit 120. Query unit 120 may store the received information within its local device performance information 134.

In some cases, the historical transaction information 110 associated with candidate devices 140 may include data such as historical operating data such local and foreign stock information, stock and option/futures information, market value information, corporate information, information related to the length of time that the information service provider has provided stock information, and the like. Similarly, real-time contextual information 108 associated with candidate devices 140 may include real-time operating data.

Device selector 122 may use analysis unit 124 and rating assignment unit 128 to analyze the received device performance information for the subset of candidate devices 140 based on the currently defined performance criteria 132. For example, if the customer or user of device 116 prioritizes reliability of information higher than recency of information, one criterion of performance criteria 132, which relates to reliability, will have an associated weight that is higher than the weight of another criterion, which relates to information recency. Rating assignment unit 128 may assign ratings to each of the subset of candidate devices 140 based on associated device performance information and performance criteria 132, and may store these ratings within rating information 135. Selection unit 126 may then select a particular candidate device from the subset of candidate devices 140 having the highest score or ranking, based on the currently defined criteria and weights from performance criteria 132.

As another illustrative use case, device 116 may be part of or associated with a distributed computing system. For example, device 116 may be configured to identify a candidate device that provides additional capacity or processing power for use within the distributed computing system. In this use case, candidate devices 140 may be associated with one or more computing or storage resources. Device 116 may attempt to identify one or more of candidate devices 140 based on the customized performance criteria 132 defined by the customer of device 116. Performance criteria may include one or more criteria that identify the consumer's valued parameters or criteria at any particular point in time (e.g., amount of storage capacity, storage speed, processing capacity, processing speed). Each criterion may have an associated weight or ranking value that also may be changed or customized over time, similar to the other use cases described above.

Device 116 may use query unit 120 to send a query to query handling unit 104 of central authority system 102 (or, in another example, to blockchain node networks 214 of FIG. 2) to request one or more portions of device performance information 106 associated with candidate devices of available computing or storage resources. In certain cases, the query sent by query unit 120 may include one or more parameters associated with requested features of candidate devices 140 (e.g., features related to the criteria described above).

Query handling unit 104 of central authority system 102 may then process the received query, and access portions of device performance information 106 that are associated with one or more of candidate devices 140. For this subset of candidate devices 140, query handling unit 104 may then access historical transaction information 110 associated with this subset of candidate devices 140. Query handling unit 104 may provide the portions of real-time contextual information and/or historical transaction information 110, which are associated with this subset of candidate devices 140, back to query unit 120. In some cases, the historical transaction information 110 associated with candidate devices 140 may include data storage information, processing power or speed information, and the like. Similarly, real-time contextual information 108 associated with candidate devices 140 may include real-time operating data (e.g., current versions of executing operating systems, current bandwidth/load conditions).

Device selector 122 may use analysis unit 124 and rating assignment unit 128 to analyze the received device performance information for the subset of candidate devices 140 based on the currently defined performance criteria 132. Rating assignment unit 128 may assign ratings to each of the subset of candidate devices 140 based on associated device performance information and performance criteria 132, and may store these ratings within rating information 135. Selection unit 126 may then select a particular candidate device from the subset of candidate devices 140 having the highest score or ranking, based on the currently defined criteria and weights from performance criteria 132.

As another illustrative use case, device 116 may be part of or associated with a computing device within a supply chain distribution system. In this system, various candidate devices 140 may be associated with supply chain entities or providers (e.g., part providers, such as an original equipment manufacturer). For example, device 116 may be configured to identify a candidate device that provides or supplies a particular component when, e.g., the customer of device 116 has run of these components (e.g., batteries, monitors, memory devices), or if the customer has experienced a failure with one or more of these components. In this use case, candidate devices 140 may be associated with one or more supply chain providers of such components.

Device 116 may attempt to identify one or more of candidate devices 140 based on the customized performance criteria 132 defined by the customer of device 116. Performance criteria may include one or more criteria that identify the consumer's valued parameters or criteria at any particular point in time (e.g., amount of available components in inventory, speed of component shipping or delivery, warranty coverage, location of supply chain provider). Each criterion may have an associated weight or ranking value that also may be changed or customized over time, similar to the other use cases described above.

Device 116 may use query unit 120 to send a query to query handling unit 104 of central authority system 102 (or, in another example, to blockchain node networks 214 of FIG. 2) to request one or more portions of device performance information 106 associated with candidate devices of available supply chain providers. In certain cases, the query sent by query unit 120 may include one or more parameters associated with requested features of candidate devices 140 (e.g., features related to the criteria described above).

Query handling unit 104 of central authority system 102 may then process the received query, and access portions of device performance information 106 that are associated with one or more of candidate devices 140. For this subset of candidate devices 140, query handling unit 104 may then access historical transaction information 110 associated with this subset of candidate devices 140. Query handling unit 104 may provide the portions of real-time contextual information and/or historical transaction information 110, which are associated with this subset of candidate devices 140, back to query unit 120. In some cases, the historical transaction information 110 associated with candidate devices 140 may include (e.g., volume of purchased components, date of purchases, shipping and delivery information, warranty information). Similarly, real-time contextual information 108 associated with candidate devices 140 may include real-time operating data or other real-time information (e.g., promotional or sales information, current inventory information for select components, and the like).

Device selector 122 may use analysis unit 124 and rating assignment unit 128 to analyze the received device performance information for the subset of candidate devices 140 based on the currently defined performance criteria 132. Rating assignment unit 128 may assign ratings to each of the subset of candidate devices 140 based on associated device performance information and performance criteria 132, and may store these ratings within rating information 135. Selection unit 126 may then select a particular candidate device from the subset of candidate devices 140 having the highest score or ranking, based on the currently defined criteria and weights from performance criteria 132.

In other illustrative use cases, device 116 may be used in various other systems, and may be used to identify various other forms of candidate devices 140. For example, candidate devices 140 may be associated with shipping and/or delivery entities or systems. In this example, device 116 may be configured to identify a particular one of candidate devices 140 to use when shipping an outgoing item, or delivering an incoming item, to a particular destination, and may use query unit 120, real-time information unit 121, device selector 122, performance criteria 132, device performance information 134 (including any real-time information such as location information or sales/promotional information), and/or rating information 135, similar to described above, to identify one or more of candidate devices 140 for use with shipping or delivery transactions. Device 116 may then use transaction unit 118 to initiate such transactions.

In another example, candidate devices 140 may be associated with financial institutions that provide loans. In this example, device 116 may be configured to identify a particular one of candidate devices 140 to use securing or servicing a loan, and may use query unit 120, real-time information unit 121, device selector 122, performance criteria 132, device performance information 134 (including any real-time information such as location information associated with device 116 or candidate devices 140, and/or sales and promotional information), and/or rating information 135, similar to described above, to identify one or more of candidate devices 140 for use with securing or servicing a loan. Device 116 may then use transaction unit 118 to initiate such loan transactions.

Referring again to FIG. 1, in various examples, system 100 may provide real-time security assessments to establish and/or verify that one or more of device 116 and/or candidate devices 140 are real and up to date. Upon determining that identified devices pass these real-time security assessments, central authority system 102 may allow communications with or between these devices. However, if one or more of devices 116/140 do not pass the security assessment, central authority system 102 may determine that these devices 116 are not secure, and may refrain from providing any information to these devices. Central authority system 102 may also refrain from providing the identifiers of these unsecure devices to any other devices. Central authority system 102 may periodically perform the real-time security assessments of devices over time (e.g., on a periodic or scheduled basis).

In these examples, central authority system 102 may perform the real-time security assessments as follows. Central authority system 102 may first check the device time that is currently set or programmed on one or more of device 116 and/or candidate devices 140. Central authority system 102 may, in some cases, check the device time based on timestamps included in messages received by, e.g., query handling unit 104 and/or transaction handling unit 105. For example, central authority system 102 may check the device time of device 116 based on timestamps included in messages sent from query unit 120 to query handling unit 104, or based on timestamps included in messages sent from transaction unit 118. In other cases, central authority system 102 may send individual request messages to device 116 and/or candidate devices 140 to receive device time information. For example, central authority system 102 may send such a request message to device 116, and device 116 may send a response message that includes the current device time programmed on device 116.

Upon receiving the device time from one or more devices, central authority system 102 may compare these device times with the currently programmed system time on central authority system 102. If the device time of one or more of devices 116 is not within a defined threshold amount of the system time maintained on central authority system 102, central authority system 102 may raise a flag or exception, and may determine that these devices are not currently secure. On the other hand, if the device time for one or more devices is within a defined threshold amount of the system time (e.g., the difference is less than the defined threshold amount), central authority system 102 may also compare the device times with universal standard time, and/or compare the difference between a respective device time and the system time with universal standard time, in order to identify potential time differences that may vary from location to location, such as a difference in time between the location of different devices and/or central authority system 102. If the determined difference is within a defined threshold amount, central authority system 102 may determine that the respective devices are secure. As noted above, for any devices that do not pass the security assessment, central authority system 102 may determine that these devices are not secure, and may refrain from providing any information to these devices, and/or refrain from providing the identifiers of these unsecure devices to any other device.

As noted above, each individual device, such as device 116, may include customized, device-specific performance criteria, such as performance criteria 132. Performance criteria 132 may, in various cases, be based on one or more factors (e.g., factors focused on the cost/quality/timeliness of the service performed, the trustworthiness of candidate devices 140, and/or the technical capabilities of the candidate devices 140). In some cases, and as noted earlier, certain criteria may comprise weighted criteria that are based on multiple different factors, where each factor has a particular weighted contribution to the overall weighted criterion or criteria. The weighting values may be predefined values or may be dynamically determined values that may change over time. In various examples, performance criteria 132 may be determined, configured, weighted, and/or adjusted based on factors that may be important to each respective device (e.g., speed/timeliness versus cost of service provided), such as device 116.

In some examples, selection unit 126 may select one or more of candidate devices 140 based on a respective composite (e.g., mean average) rating that is calculated for each of candidate devices 140. Rating assignment unit 128 may calculate these composite ratings based on the received device performance information for these candidate devices 140. Selection unit 126 may then use the composite ratings to select one or more of candidate devices 140 with which device 116 may perform a transaction.

In some examples, one or more of candidate devices 140 may comprise a device chain, or chain of candidate devices. In these examples, a candidate device (e.g., a mobile phone) may include or be associated with one or more other candidate devices (e.g., an automobile), and this group of candidate devices may comprise a device chain. The real-time rating information may be associated with all of the candidate devices in the device chain, where each individual candidate device has its own unique identifier.

For instances in which device chains are used, central authority system 102 may send device 116 the identifier of each candidate device, as well an indication that the candidate devices are associated with a particular device chain (e.g., through the use of a chain identifier or other indication or relationship). Device 116 may then use rating assignment unit 128 to determine real-time rating information that is associated with the collective group of candidate devices in this device chain (e.g., rating information associated with the combination of a mobile phone that is currently being used in a particular automobile), and store this information in rating information 135.

In various cases, a registry (e.g., registry local to device 116, a central registry on central authority system 102) may store device chain information and/or associations between devices. For example, device performance information 106 may include the identification data of individual candidate devices, as well as identification or association data that groups candidate devices together into collective device chains (e.g., using device chain identifiers or other association identifiers). For example, real-time contextual information 108 and/or transaction information 110 may include information that is associated with groups of chains of devices based on individual or chain/association identifiers.

In some examples, the requesting machine, such as device 116, may gather a relatively small amount of device performance information 106 for a relatively small number of candidate devices with which to perform a transaction, and may store this locally in its device performance information 134. In these examples, the requesting machine may calculate the ratings for each of candidate devices 140, and selection unit 126 (e.g., using rating assignment unit 128) may select one or more of candidate devices 140 that has the highest rating.

In other examples, the requesting device may gather a relatively large amount of device performance information 106 from central authority system 102 for a relatively large number of candidate devices 140 with which to perform the transaction. In these examples, the requesting device may include a machine learning engine. For example, as shown in FIG. 1, device 116 may include optional machine learning engine 130 that may comprise an artificial intelligence (AI) or deep learning engine capable of analyzing a large volume of device performance information 106 for candidate devices 140 to select the optimum candidate device for device 116 to use when performing the transaction. As also described above, over time, machine learning engine 130 may be configured to continuously learn which criteria are more important, or have higher weight, based on monitored behavior of device 116, and may machine learning engine 130 may correspondingly update performance criteria 132. In such fashion, performance criteria 132 may include the most current and/or pertinent performance criteria to use at any given time, and these criteria are customized specifically to device 116 based relevance and/or importance of relevant performance parameters.

Figure 2:
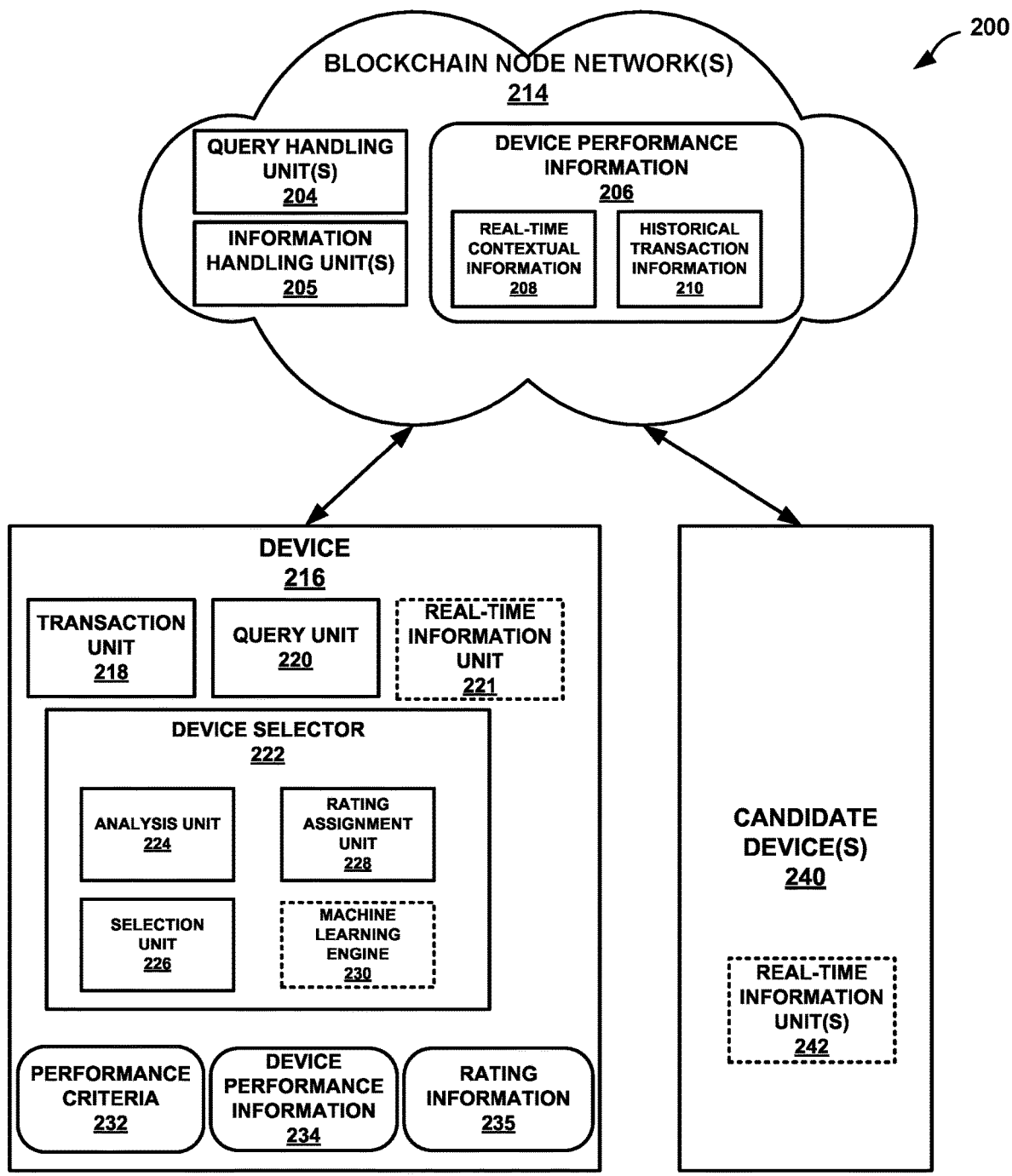
FIG. 2 is a block diagram illustrating another example distributed system that is configured to determine rating information associated with one or more candidate devices, in accordance with techniques of this disclosure.

FIG. 2 is a block diagram illustrating another example distributed system 200 that is configured to determine rating information associated with one or more candidate devices 240, in accordance with techniques of this disclosure. In the example of FIG. 2, device performance information 206 that is provided to device 216 may be stored using blockchain technology, such as within at least one node of one or more blockchain node networks 214.

Similar to system 100 shown in FIG. 1, system 200 of FIG. 2 is a dynamic and customer-centric device rating system that enables device 216 to dynamically and autonomously determine rating information for other candidate devices 240 with which to perform a new transaction. The rating determination techniques enable a device 216 to determine customized and device-specific ratings of one or more of candidate devices 240 based on device performance information 206, portions of which may be stored locally in device performance information 234. Device 216 analyzes the performance information and rates the performance of candidate devices 240 based on parameters or criteria defined by device 216, such as performance criteria 232. Device 216 may use the dynamic ratings to, e.g., identify the capabilities and/or trustworthiness of candidate devices 240 to determine whether to perform any transactions with identified devices.

System 200 includes certain similarly numbered elements to those included in system 100 of FIG. 1, where these similarly numbered elements provide similar functionality to that described above in reference system 100. For example, system 200 includes device 216 and candidate devices 240. Device 216 includes a transaction unit 218, a query unit 220, a device selector 222, performance criteria 232, device performance information 234, rating information 235, and optional real-time information unit 221. Device selector 222 of device 216 includes analysis unit 224, selection unit 226, rating assignment unit 228, and optional machine learning engine 230. Candidate devices 240 may also include one or more real-time information units 242.

Unlike system 100, however, which includes a central authority system 102, system 200 of FIG. 2 includes one or more blockchain node networks 214. Blockchain node networks 214 implement blockchain technology and include one or more nodes within these blockchain node networks 214. Blockchain node networks 214 provide one or more distributed networks of nodes that provide various compute and/or storage functions. Although blockchain node networks 214 comprise a distributed network of nodes, these nodes provide functionality similar to that provided by central authority system 102 shown in FIG. 1.

For example, blockchain node networks 214 include one or more nodes that provide functionality for one or more query handling units 204 and one or more information handling units 205. Query handling units 204 and information handling units 205 may include functionality that is similar to query handling units 104 and information handling units 105, respectively. One or more nodes includes in blockchain node networks 214 may also provide storage for device performance information 206, which is similar to device performance information 106. Performance information 206 includes real-time contextual information 208 and historical transaction information 210. Query handling units 204 and information handling units 205 may store data to and/or retrieve data from real-time contextual information 208 and historical transaction information 210.

Similar to the description above regarding system 100 of FIG. 1, device 216 of system 200 may use query unit 220 to send a request for performance information that is associated with one or more of candidate devices 240 with which device 216 may perform a new transaction. However, in the case of system 200, device 216 sends this request to blockchain node networks 214. Responsive to sending the request, query unit 220 may receive the performance information (e.g., one or more portions of device performance information 206 stored in blockchain node networks 214), which includes data associated with at least one historical transaction previously performed by candidate devices 240. In some instances, this performance information may also include real-time contextual information, such as one or more portions of real-time contextual information 208. In these instances, query handling units 204 may include these portions of real-time contextual information 208 when providing performance information back to device 216 in response to the query. In alternate examples, device 216 may send a separate query to query handling units 204 to request portions of real-time contextual information 208 (e.g., using optional real-time information unit 221).

Device 216 may then analyze the received performance information, such as by using an analysis unit 224 of device selector 222. Analysis unit 224 analyzes this performance information using one or more device-specific performance criteria 232, which are specific to and defined by device 216. In some cases, device 216 may store the received performance information locally as device performance information 234, as indicated in FIG. 2.

Device 216 may then use a rating assignment unit 228 to determine, based on the analysis performed by analysis unit 224, device-specific rating information, which is specific to and customized for device 216 and which is associated with candidate devices 240. The rating information is customized for device 216 using the device-specific performance criteria 232 that are defined by device 216. Selection unit 226 of device 216 may select, based on the device-specific rating information, a particular candidate device from candidate devices 240, and transaction unit 218 of device 216 may then initiate, with the particular candidate device, performance of the new transaction.

Figure 3:
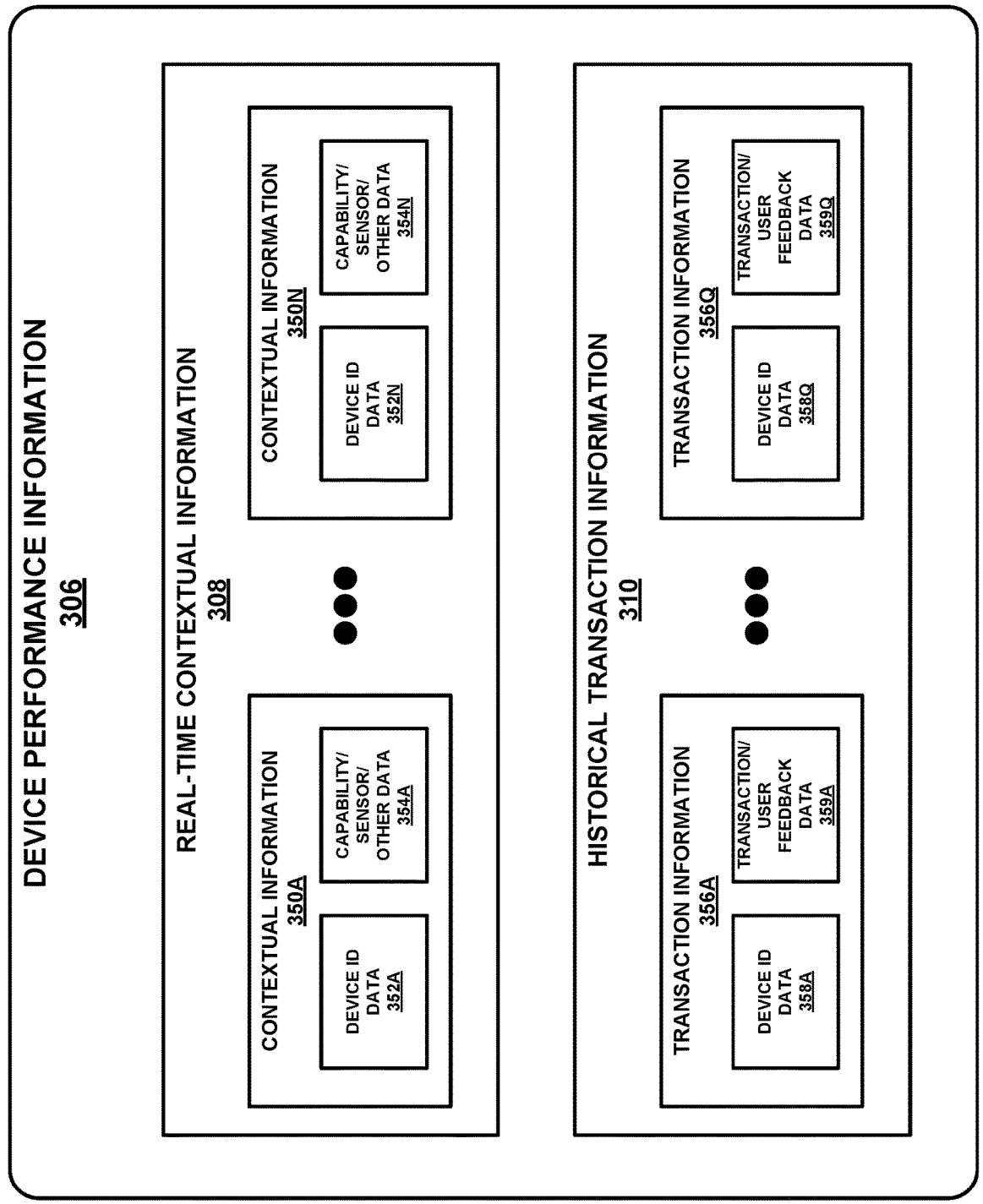
FIG. 3 is a block diagram illustrating further example details of the device performance information shown in FIGS. 1-2, in accordance with techniques of this disclosure.

FIG. 3 is a block diagram illustrating further example details of the device performance information shown in FIGS. 1-2, in accordance with techniques of this disclosure. In FIG. 3, device performance information 306 may be one example of device performance information 106 stored on central authority system 102 (FIG. 1), device performance information 134 stored locally on device 116 (FIG. 1), device performance information 206 stored in blockchain node networks 214 (FIG. 2), and/or device performance information 234 stored locally on device 216 (FIG. 2).

In the example of FIG. 3, device performance information 306 includes real-time contextual information 308 and historical transaction information 310. Historical transaction information 310 may include any form of transaction data associated with prior transactions performed by candidate devices, such as prior transactions performed with one or more other devices. In general, historical transaction information 310 includes transaction information 356A-356Q (collectively, "transaction information 356") for one or more transactions. Transaction information 356 may include respective information for each particular transaction. For instance, transaction information 356A may include information for a particular transaction, and transaction information 356Q may include information for another transaction. Each transaction may be associated with device identification (ID) data and transaction/user feedback data. For example, as shown in FIG. 3, transaction information 356A includes device ID data 358A and transaction/user feedback data 359A. Similarly, transaction information 356Q includes device ID data 358Q and transaction/user feedback data 359Q.

Device ID data 358A may include the unique identifiers of one or more devices (e.g., device 116 and/or one or more of candidate devices 140) that may have participated or otherwise engaged in the transaction associated with transaction information 356A. In the case of a physical device, the unique identifier for the device may, in some cases, be the device's Internet Protocol (IP) or media access control (MAC) address. In the case of a virtual device (e.g., virtual machine), the unique identifier may be an identifier associated with or assigned by the physical device on which the virtual device is executed.

Transaction/user feedback data 359A may include any transaction and/or user feedback data for the transaction associated with transaction information 356A. Transaction data may, for instance, include transaction detail information such as the type of transaction and/or other metadata associated with the transaction, such as historical transaction volume or count, amount of money/data, and/or machine operating data associate with prior transactions. Machine operating data may include environmental condition data, location data, and/or time data associated with these transactions. In some cases, data 359A may include user-provided feedback or manually entered rating information provided by customers of services or products during or after the transaction. For instance, user-provided rating information may provide, e.g., indications of services that are performed by a candidate device, capabilities of a candidate device, cost or timing characteristics associated with performed services, operating systems or communication protocols used by a candidate device, quality of services provided, and/or trustworthiness of a candidate device.

In various examples, historical transaction information 310 may be populated and updated based upon information collected and/or provided by a central authority system (e.g., information handling unit 105), or by at least one node of a blockchain node network (e.g., information handling unit 205). In various examples, information handling unit 105/205 is capable of monitoring transactions that occur within the system. In certain cases, information handling unit 205 is configured to populate and update transaction information 310 based upon direct involvement in certain transactions that occur between devices. In some cases, information handling unit 105/205 is configured to populate and update transaction information 310 based upon transaction data it receives from one or more of devices (e.g., transaction data provided by one or more of devices based on transactions that occur between these devices). In certain examples, transaction information 310 may be stored in a device's local registry (e.g., device performance information 134/234).

Device performance information 306 shown in FIG. 3 also includes real-time contextual information 308. Real-time contextual information 308 may include contextual information 350A-350N (collectively, "contextual information 350") associated with different candidate devices within a system. For instance, contextual information 350A may be associated with a first candidate device (e.g., one of candidate devices 140), and contextual information 350N may be associated with a second candidate device (e.g., another one of candidate devices 140).

The contextual information may include device ID data and capability/sensor data. For example, contextual information 350A includes device ID data 352A and capability/sensor/other data 354A, and contextual information 350N includes device ID data 352N and capability/sensor/other data 354N. In general, contextual information 350 may include real-time contextual information associated with real-time performance or operational data associated with one or more of candidate devices 140.

As an example, device ID data 352A may include unique device identification data for a candidate device that is associated with contextual information 350A (e.g., similar to device ID data 358A of transaction information 356A). Capability/sensor/other data 354A may include various real-time capability sensor, and/or other contextual data associated with the candidate device. For example, data 354A may include, e.g., real-time transaction volume or count information, real-time money/data information, hardware and/or software data associated with the candidate device technical specification and/or capability data associated with the candidate device, and/or real-time machine operating data (e.g., environmental data, location data, time data) associated with one or more of candidate devices 140.

In some cases, real-time contextual information 308 may be collected or provided directly from devices, such as device 116 and/or candidate devices 140. In some cases, real-time information 308 may be collected or provide by a central authority system (e.g., central authority system 102) or a blockchain node network (e.g., blockchain node network 214), which may store real-time contextual information within its device performance information (e.g., within real-time contextual information 108 in central authority system 102, real-time contextual information 208 in blockchain node network 214).

Capability data of data 354A may include, e.g., data indicating any capabilities or services provided by a candidate device, costs associated with such services, communication protocols used by a candidate device in communicating with other entities in the system, and/or the operating system(s) utilized by the candidate device, to name only a few examples. In certain examples, capability data 354A may be uniquely related to the components (e.g., technical specifications and/or capabilities) of the candidate device. For instance, capability data 354A may include data associated with the components and/or capabilities of the candidate device. To name a few examples, this data may include information about processing capability (e.g., load balancing, speed, and/or efficiency), communication capability (e.g., available communication channels, reliability of channels, and/or channel signal strength), failure rate, power handling and supply, life span, and/or certification status, etc. In certain examples, this data may include information related to one or more hardware or software components of the candidate device (e.g., a processor, a volatile or non-volatile memory, a graphics processing unit, a data storage device, a network interface card, an operating system, etc.).

In some cases, the central authority system or blockchain node network may collect and/or provide capability data 354A for storage in real-time contextual information 308 based on information provided directly from corresponding devices. In certain cases, the central authority system or blockchain node network may also collect capability data 354A for a candidate device from one or more other devices within the system, based upon these devices' prior interactions or transactions with the candidate device.

Figure 4:
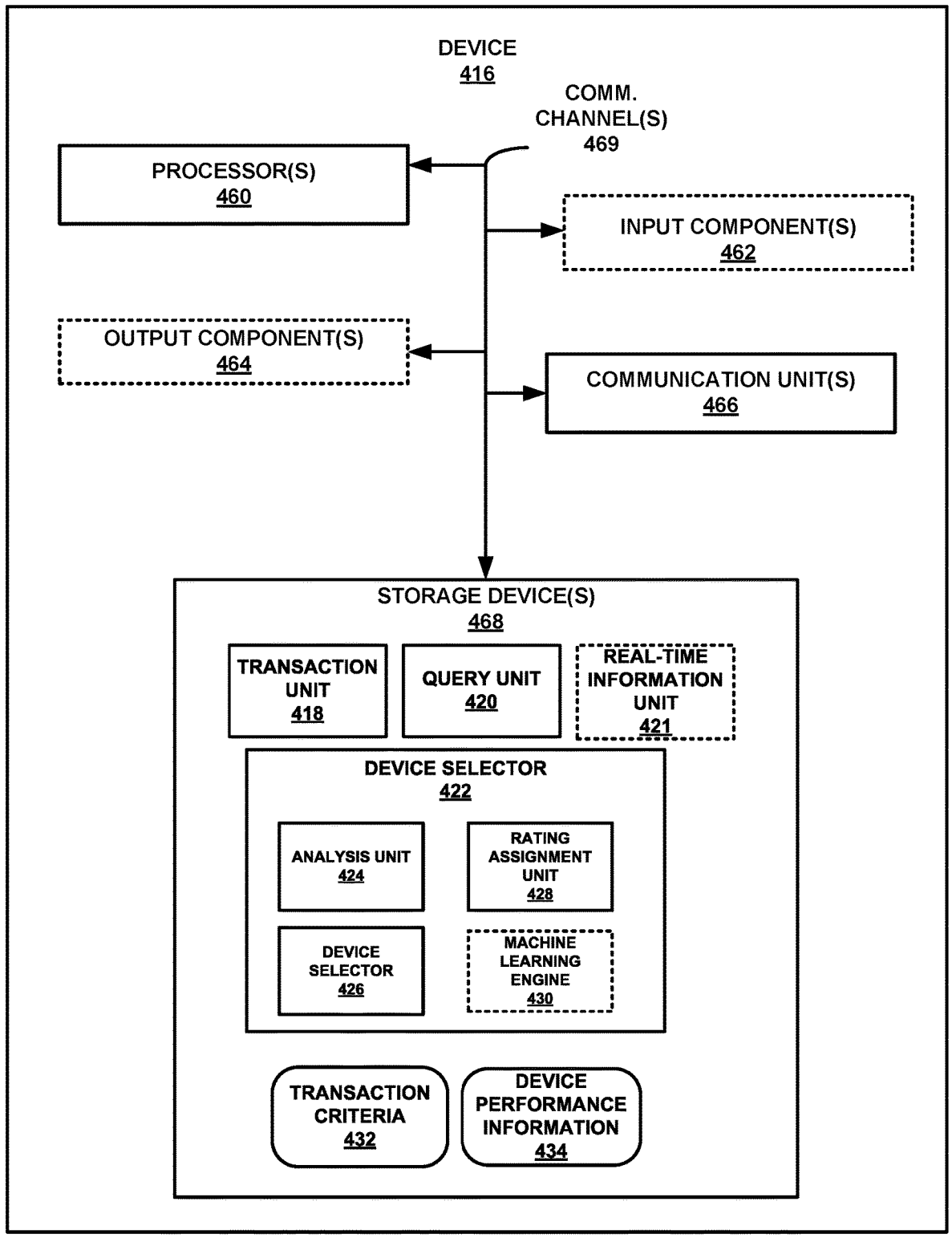
FIG. 4 is a block diagram illustrating further example details of one or more of the devices shown in FIGS. 1-2, in accordance with techniques of this disclosure.

FIG. 4 is a block diagram illustrating further example details of one or more of the devices shown in FIGS. 1-2, in accordance with techniques of this disclosure. Device 416 shown in FIG. 4 may be one example of any of the devices 116/140 shown in FIG. 1, or any of the devices 216/240 shown in FIG. 2. In some alternate examples, device 416 may be one example of central authority system 102 of FIG. 1, or of one or more nodes includes in blockchain node networks 214 of FIG. 2.

Device 416 may be implemented as any suitable computing device, machine, or system, such as one or more server computers, workstations, mainframes, appliances, cloud computing systems, and/or other computing systems that may be capable of performing operations and/or functions described in accordance with one or more aspects of the present disclosure. In some examples, device 416 may comprise one or more physical entities, while in other examples, device 416 may comprise one or more virtual entities (e.g., virtual machines). FIG. 4 illustrates only one particular example of device 416, and many other examples of device 416 may be used in other instances and may include a subset of the components included in example device 416 or may include additional components not shown in FIG. 4.

As shown in the example of FIG. 4, device 416 includes one or more processors 460, one or more optional input components 462, one or more communication units 466, one or more optional output components 464, and one or more storage devices 468. Communication channels 469 may interconnect each of the components 460, 462, 464, 466, and 468 for inter-component communications (physically, communicatively, and/or operatively). In some examples, communication channels 469 may include a system bus, a network connection, an inter-process communication data structure, or any other method for communicating data between hardware and/or software.

One or more input components 462 of device 416 may receive input. Examples of input are tactile, audio, and video input. Examples of input components 462 include a presence-sensitive screen, touch-sensitive screen, mouse, keyboard, voice responsive system, video camera, microphone or any other type of device for detecting input from a human or machine.

One or more output components 464 of device 416 may generate output. Examples of output are tactile, audio, and video output. Examples of output components 464 include a presence-sensitive screen, sound card, video graphics adapter card, speaker, cathode ray tube (CRT) monitor, liquid crystal display (LCD), or any other type of device for generating output to a human or machine. Output components 464 may include display devices such as cathode ray tube (CRT) monitor, liquid crystal display (LCD), or any other type of device for generating tactile, audio, and/or visual output.

One or more communication units 466 of device 416 may communicate with one or more other devices via one or more networks by transmitting and/or receiving network signals on the one or more networks. Examples of communication units 466 include a network interface card (e.g. such as an Ethernet card), an optical transceiver, a radio frequency transceiver, or any other type of device that can send and/or receive information, such as through a wired or wireless network. Other examples of communication units 466 may include short wave radios, cellular data radios, wireless Ethernet network radios, as well as universal serial bus (USB) controllers.

One or more storage devices 468 within device 416 may store information for processing during operation of device 416 (e.g., device 416 may store data accessed by one or more modules, processes, applications, or the like during execution at device 416). In some examples, storage devices 468 on device 416 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art. In some cases, storage devices 468 may include redundant array of independent disks (RAID) configurations and one or more solid-state drives (SSD's).

Storage devices 468, in some examples, also include one or more computer-readable storage media. Storage devices 468 may be configured to store larger amounts of information than volatile memory. Storage devices 468 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 468 may store program instructions and/or data associated with one or more software/firmware elements or modules.

For example, when device 416 comprises an example of device 116 shown in FIG. 1, storage devices 468 may store instructions and/or data associated with a transaction unit 418, a query unit 420, a device selector 422, transaction criteria 432, device performance information 434, and optional real-time information unit 421. Device selector 422 includes analysis unit 424, device selector 426, rating assignment unit 428, and optional machine learning engine 430. These may be examples of similarly named components shown in FIG. 1. In other examples, these may be examples of similarly named components of device 216, as shown in FIG. 2.

Device 416 further includes one or more processors 460 that may implement functionality and/or execute instructions within device 416. For example, processors 460 may receive and execute instructions stored by storage devices 468 that execute the functionality of the elements and/or modules described herein. These instructions executed by processors 460 may cause device 416 to store information within storage devices 468 during program execution. Processors 460 may also execute instructions of the operating system to perform one or more operations described herein.

Figure 5:
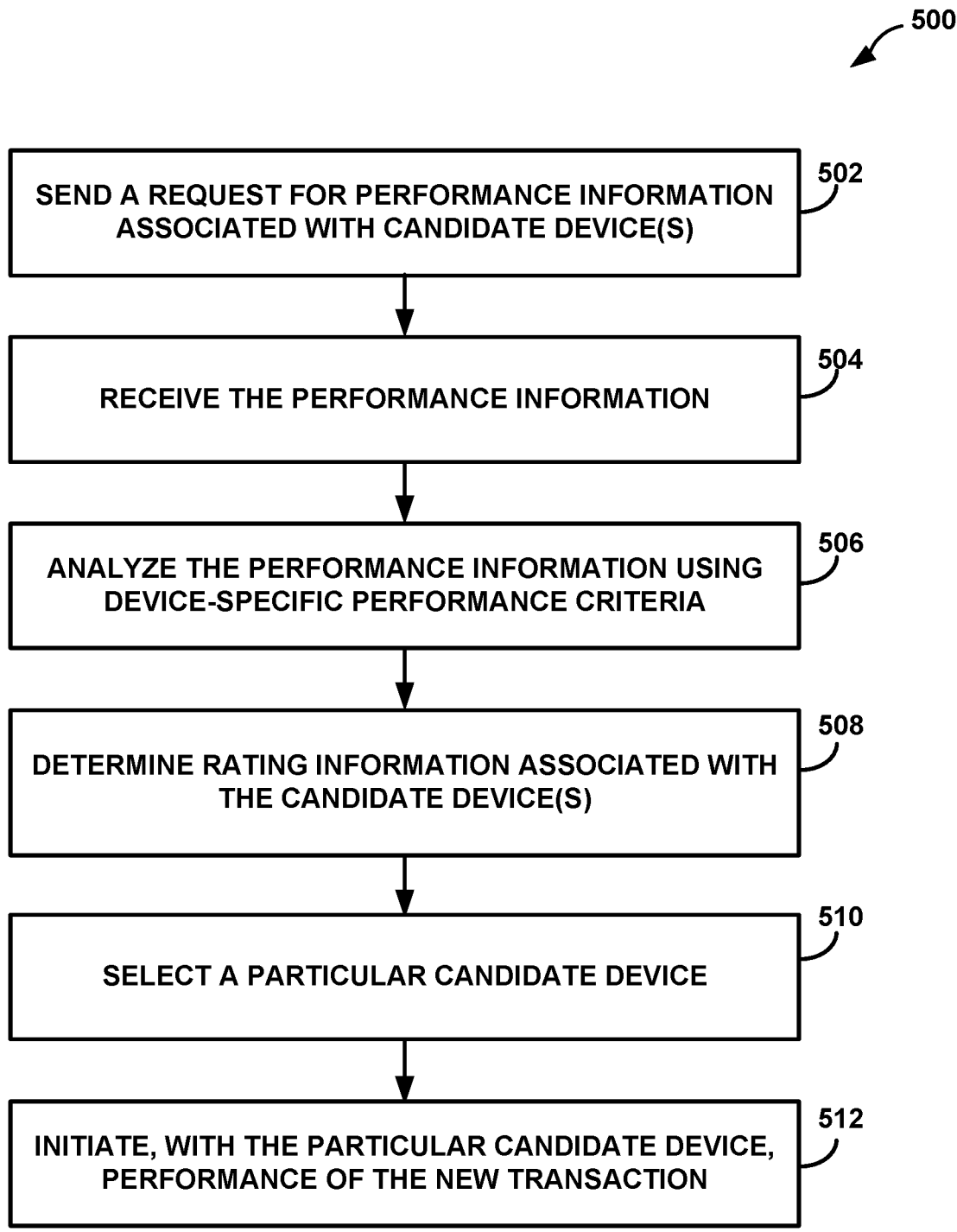
FIG. 5 is a flow diagram illustrating example operations to determine rating information associated with one or more candidate devices in a distributed system, in accordance with techniques of this disclosure.

FIG. 5 is a flow diagram illustrating example operations to determine rating information associated with one or more candidate devices in a distributed system, in accordance with techniques of this disclosure. As indicated in the example of FIG. 5, example process 500 includes operations 502, 504, 506, 508, 510, and 512. In various examples, device 116 (FIG. 1) and/or device 216 (FIG. 2) may perform process 500. For purposes of illustration only, in the description of FIG. 5 below, it will be assumed that device 116 performs the recited operations while interacting with other entities in system 100.

Device 116 may send (502) (e.g., to central authority system 102 or blockchain node network 214) a request for performance information (e.g., a portion of device performance information 106) associated with one or more candidate devices (e.g., candidate devices 140) with which the device may perform a new transaction. Responsive to sending the request, device 116 may receive (504) (e.g., from central authority system 102 or blockchain node network 214) the performance information that includes data associated with at least one historical transaction previously performed by the one or more candidate devices 140. In some cases, device 116 may store the received performance information locally (e.g., in device performance information 134).

Device 116 may analyze (506) the received performance information using one or more device-specific performance criteria (e.g., performance criteria 132) defined by device 116. The one or more device-specific performance criteria are associated with at least one of the new transaction or the one or more candidate devices. Device 116 may determine (508), based on the analyzing, rating information (e.g., rating information 135) associated with the one or more candidate devices 140. The rating information is customized for device 116 using the device-specific performance criteria that are defined by device 116. Device 116 may then select (510), based on the rating information, a particular candidate device from the one or more candidate devices 140, and initiate (512), with the particular candidate device, performance of the new transaction. In various cases, device 116 autonomously, and without user intervention, performs one or more of sending (502) the request, receiving (504) the performance information, analyzing (506) the performance information, determining (508) the rating information, selecting (510) the particular candidate device, or initiating (512) performance of the new transaction.

In some examples, device 116 may also receive (e.g., using query unit 120 and/or real-time information unit 121) real-time contextual information (e.g., one or more portions of real-time contextual information 108; information from real-time information units 142) associated with the one or more candidate devices 140. Device 116 may store the real-time contextual information within the performance information (e.g., in device performance information 134) associated with the one or more candidate devices 140, such that the performance information includes the real-time contextual information and the data associated with the at least one historical transaction previously performed by the one or more candidate devices 140. In certain cases, the real-time contextual information associated with candidate devices 140 may include real-time information associated with one or more of a transaction volume or count, an amount of data, hardware or software component data associated with one or more of candidate devices 140, technical specification or capability data associated with one or more of candidate devices 140, or machine operating data associated with candidate devices 140. The machine operating data may include at least one of environmental condition data, location data, or time data associated with candidate devices 140. In some cases, the real-time contextual information associated with candidate devices 140 may include at least one of sensor data or capability data (e.g., capability and/or sensor data 354A-354N) associated with candidate devices 140.

As further discussed herein with reference to at least FIG. 1, in certain examples, performance criteria 132 may be uniquely related to the components (e.g., technical specifications and/or capabilities) of candidate devices 140. That is, performance criteria 132 may relate to the components that enable operation of candidate devices 140. Accordingly, device 116 may also receive (e.g., using query unit 120 and/or real-time information unit 121) real-time contextual information (e.g., one or more portions of real-time contextual information 108, information from real-time information units 142) that may include data descriptive of the technical specifications and/or capabilities of the candidate devices 140. In some examples, device 116 may analyze (e.g., using analysis unit 124) the performance information using the one or more device-specific performance criteria and one or more device-specific weights. Each of the one or more device-specific weights is associated with a ranking of a respective one of the device-specific performance criteria. Device 116 may determine (e.g., using rating assignment unit 128) the rating information associated with candidate devices 140 by applying the one or more device-specific performance criteria to the performance information in accordance with the one or more device-specific weights. In certain cases, device 116 may customize (e.g., using machine learning engine 130 and with a machine-learning model) at least one of the one or more device-specific performance criteria or the one or more device-specific weights based on behavior of device 116 over time.

In some examples, the one or more device-specific performance criteria may indicate one or more of a type of services previously performed by candidate devices 140, capabilities of candidate devices 140 to perform requested services, cost or timing characteristics associated with services previously performed by candidate devices 140, operating systems or communication protocols used by candidate devices 140, a quality of services provided by candidate devices 140, or a trustworthiness of candidate devices 140.

In some examples, device 116 may receive (e.g., using query unit 120) the performance information associated with candidate devices 140 by receiving first performance information associated with a first candidate device, where the first performance information includes first data associated with at least one first historical transaction previously performed by the first candidate device, and also receiving second performance information associated with a second candidate device, where the second performance information includes second data associated with at least one second historical transaction previously performed by the second candidate device. Device 116 may determine (e.g., using rating assignment unit 128) the rating information associated with candidate devices 140 by determining, based on analyzing the first rating information using the one or more device-specific performance criteria, first rating information associated with the first candidate device, and by determining, based on analyzing the second rating information using the one or more device-specific performance criteria, second rating information associated with the second candidate device. Device 116 may select (e.g., using selection unit 126) the particular candidate device by performing at least one of (i) responsive to determining that a first score of the first rating information score is higher than a second score of the second rating information, select the first candidate device as the particular candidate device, or (ii) responsive to determining that the second score of the second rating information score is higher than the first score of the first rating information, select the second candidate device as the particular candidate device.

In some examples, the request sent by device 116 (e.g., using query unit 120) includes one or more parameters specified by device 116 that are associated with the new transaction. For example, the one or more parameters may include location information associated with at least one of device 116 or candidate devices 140.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable and programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computing device comprising a storage device and processing circuitry, wherein the processing circuitry has access to the storage device and is configured to:
output, to a blockchain node network, a request for information about a plurality of candidate devices capable of performing a new transaction, wherein the blockchain node network receives requests from a plurality of other computing devices about the plurality of candidate devices;
receive, from the blockchain node network and responsive to outputting the request, performance information about the plurality of candidate devices, wherein the performance information includes data associated with each of the plurality of candidate devices that have previously performed a historical transaction with a different computing device, and wherein the performance information further includes user feedback data associated with at least one historical transaction performed by one of the plurality of candidate devices;

identify, based on the performance information including the user feedback data and further based on selection criteria available to the computing device, a selected candidate device from among the plurality of candidate devices; and initiate the new transaction with the selected candidate device.

2. The computing device of claim 1, wherein to identify the selected candidate device, the processing circuitry is further configured to:

analyze the performance information using the selection criteria; and rate the plurality of candidate devices.

3. The computing device of claim 2, wherein the selection criteria include parameters relating to the new transaction.

4. The computing device of claim 2, wherein the selection criteria include parameters relating to the plurality of candidate devices.

5. The computing device of claim 1, wherein to receive the performance information, the processing circuitry is further configured to:

receive contextual information associated with at least a subset of the candidate devices.

6. The computing device of claim 5, wherein to receive the contextual information, the processing circuitry is further configured to:

receive near-real-time contextual information associated with the subset of the candidate devices.

7. A method comprising:

outputting, by a computing device and to a blockchain node network, a request for information about a plurality of candidate devices capable of performing a new transaction, wherein the blockchain node network receives requests from a plurality of other computing devices about the plurality of candidate devices;

receiving, by the computing device from the blockchain node network and responsive to outputting the request, performance information about the plurality of candidate devices, wherein the performance information includes data associated with each of the plurality of candidate devices that have previously performed a historical transaction with a different computing device, and wherein the performance information further includes user feedback data associated with at least one historical transaction performed by one of the plurality of candidate devices;

identifying, by the computing device and based on the performance information including the user feedback data and further based on selection criteria available to the computing device, a selected candidate device from among the plurality of candidate devices; and initiating, by the computing device, the new transaction with the selected candidate device.

8. The method of claim 7, wherein identifying the selected candidate device includes:

analyzing the performance information using the selection criteria; and rating the plurality of candidate devices.

9. The method of claim 8, wherein the selection criteria include parameters relating to the new transaction.

10. The method of claim 8, wherein the selection criteria include parameters relating to the plurality of candidate devices.

11. The method of claim 7, wherein receiving the performance information includes:

receiving contextual information associated with at least a subset of the candidate devices.

12. The method of claim 11, wherein receiving the contextual information includes:

receiving near-real-time contextual information associated with the subset of the candidate devices.

13. Non-transitory computer-readable media comprising instructions that, when executed, configure processing circuitry of a computing device to:

output, to a blockchain node network, a request for information about a plurality of candidate devices capable of performing a new transaction, wherein the blockchain node network receives requests from a plurality of other computing devices about the plurality of candidate devices;

receive, from the blockchain node network and responsive to outputting the request, performance information about the plurality of candidate devices, wherein the performance information includes data associated with each of the plurality of candidate devices that have previously performed a historical transaction with a different computing device, and wherein the performance information further includes user feedback data associated with at least one historical transaction performed by one of the plurality of candidate devices;

identify, based on the performance information including the user feedback data and further based on selection criteria available to the computing device, a selected candidate device from among the plurality of candidate devices; and initiate the new transaction with the selected candidate device.

14. The computer-readable media of claim 13, wherein the instructions that configure the processing circuitry to identify the selected candidate device further include instructions that configure the processing circuitry to:

analyze the performance information using the selection criteria; and rate the plurality of candidate devices.

15. The computer-readable media of claim 14, wherein the selection criteria include parameters relating to the new transaction.

16. The computer-readable media of claim 14, wherein the selection criteria include parameters relating to the plurality of candidate devices.

* * * * *